United States Patent
Shin

(10) Patent No.: US 7,345,870 B2
(45) Date of Patent: Mar. 18, 2008

(54) DISPLAY AND DISPLAY MOUNTING APPARATUS

(75) Inventor: Yong-ha Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 11/009,010

(22) Filed: Dec. 13, 2004

(65) Prior Publication Data

US 2005/0152102 A1    Jul. 14, 2005

(30) Foreign Application Priority Data

Jan. 9, 2004   (KR) ...................... 10-2004-0001491

(51) Int. Cl.
*G06F 1/16*   (2006.01)
(52) U.S. Cl. ..................... 361/681; 248/917; 248/920
(58) Field of Classification Search ............... 361/679, 361/681–683, 724–727; 248/274.1, 276.1, 248/917–923, 284.1
See application file for complete search history.

(56) References Cited

U.S. PATENT DOCUMENTS

| | | | |
|---|---|---|---|
| 6,019,332 A | | 2/2000 | Sweere et al. |
| 6,061,104 A | | 5/2000 | Evanicky et al. |
| 6,102,348 A | * | 8/2000 | O'Neill ................ 248/289.11 |
| 6,402,109 B1 | * | 6/2002 | Dittmer .................. 248/284.1 |
| 2002/0179791 A1 | * | 12/2002 | Kwon ..................... 248/284.1 |
| 2002/0179801 A1 | * | 12/2002 | Kim ........................ 248/441.1 |
| 2004/0232298 A1 | * | 11/2004 | Bremmon et al. ...... 248/281.11 |
| 2005/0110911 A1 | * | 5/2005 | Childrey et al. ............ 348/794 |
| 2005/0133678 A1 | * | 6/2005 | Dittmer ................... 248/274.1 |

FOREIGN PATENT DOCUMENTS

JP    11-272196    10/1999

(Continued)

OTHER PUBLICATIONS

International Search Report dated Feb. 23, 2005 PCT/KR2004/003273(listing 4 references).

*Primary Examiner*—Jayprakash Gandhi
*Assistant Examiner*—Anthony Q Edwards
(74) *Attorney, Agent, or Firm*—Stanzione & Kim, LLP

(57) ABSTRACT

A display with a display main body having a screen includes an upper link assembly which includes an upper first link having a first end rotatably coupled with a mounting wall, and an upper second link having a first end rotatably coupled with the display main body and a second end rotatably coupled with a second end of the upper first link and connects an upper rear portion of the display main body to the mounting wall, and a lower link assembly which includes a lower first link having a first end rotatably coupled with the mounting wall, and a lower second link having a first end rotatably coupled with the display main body and a second end rotatably coupled with a second end of the lower first link and connects a lower rear portion of the display main body to the mounting wall. The display main body is rotatable between a first tilted position that an upper portion thereof is apart from the mounting wall while a lower portion is in contact with the mounting wall, and a second tilted position that the upper portion is in contact with the mounting wall while the lower portion is apart from the mounting wall.

35 Claims, 7 Drawing Sheets

FOREIGN PATENT DOCUMENTS

| | | |
|---|---|---|
| JP | H11-34934 | 12/1999 |
| JP | 2000-267581 | 9/2000 |
| JP | 2002-244570 | 8/2002 |
| JP | 2002-341782 | 11/2002 |
| JP | 2004-110043 | 4/2004 |
| KR | 2000-14406 | 7/2000 |
| KR | 20-0314494 | 5/2003 |
| KR | 10-042882 | 10/2003 |
| KR | 2004-78328 | 9/2004 |

* cited by examiner

DISPLAY AND DISPLAY MOUNTING APPARATUS

CROSS-REFERENCE TO RELATED APPLICATIONS

This application claims the benefit of Korean Patent Application No. 2004-01491, filed on Jan. 9, 2004, in the Korean Intellectual Property Office, the disclosure of which is incorporated herein by reference.

BACKGROUND OF THE INVENTION

1. Field of the Invention

The present general inventive concept relates to a display, and more particularly, to a display having an improved structure to mount a display main body onto a mounting wall.

2. Description of the Related Art

Generally, a display includes a display main body having a screen, and a display mounting apparatus for mounting the display main body onto a predetermined seating place.

Recently, the display main body employs a display device, such as a liquid crystal display (LCD), a plasma display panel (PDP), etc., for a screen, so that an area of the screen becomes larger and a thickness thereof becomes relatively thin, thereby allowing the display main body to be readily mounted onto a mounting wall.

A display mounting apparatus for mounting an object, such as a display main body, onto a mounting wall is disclosed in Japanese Patent First Publication No. 1999-344934. As shown in FIG. 7, a display with such a display mounting apparatus includes a display main body 101 having a screen, a pair of arms 150 supporting the display main body 101, a base 130 rotatably coupled with a lower portion of the arm 150 and mounted to a mounting wall 170, and a mounting bracket 110 provided between the arm 150 and the base 130 and rotatably connecting the arm 150 with the base 130.

The mounting bracket 110 includes a first link 113 having a first end rotatably coupled to an upper portion of the base 130, a second link 117 having a first end rotatably coupled with the arm 150 and a second end rotatably coupled with a second end of the first link 113, and a locking unit 116 provided in a coupling portion between the second end of the first link 113 and the second end of the second link 117.

The locking unit 116 includes a compression spring (not shown) thereinside, wherein a mutual rotation between the first and second links 113 and 117 is locked by the compression spring. Such locking unit 116 allows the mutual rotation to be selectively locked step by step at a desired position among seven tilted angles. On the other hand, to release the locked state of the mutual rotation between the first and second links 113 and 117, the locking unit 116 is movable in a direction perpendicular to a surface containing the first and second links 113 and 117 to compress the compression spring. Therefore, in a state that the locking unit 116 is released, the first and second links 113 and 117 can be mutually rotated.

Further, the base 130 is provided with a damping unit. Such damping unit includes a gas damper 160 stationarily provided in the base 130, and a wire 161 having a first end coupled to an upper portion of the gas damper 160 and a second end coupled to a shaft (not shown) provided between the arms 150. Thus, even though the locking unit 116 is released, the display main body 101 is prevented from forward falling due to its weight.

As described above, in the conventional mounting apparatus, the arm 150 and the base 130 are provided between the display main body 101 and the mounting wall 170, and the mounting bracket 110 is further provided between the arm 150 and the base 130, thereby allowing an object, such as the display main body 101, to be rotated with respect to a predetermined axis. Further, the locking unit 116 is provided in the mounting bracket 110, so that the rotation of the object can be locked and released at a predetermined tilted position. Also, the damping unit including the gas damper 160 and the wire 161 is provided in the base 130, so that the object is prevented from falling even though the locking unit 116 is released. Thus, a view angle of the object can be easily adjusted.

However, in the conventional display, since the mounting apparatus includes the damping unit having the gas damper and the wire, and the locking unit, etc., a structure thereof becomes complicated.

Besides, in the conventional display, when a user rotates the display main body 101 as shown in FIG. 7 to adjust the view angle thereof, an upper portion of the display main body 101 is spaced from the mounting wall and frontward tilted, but a lower portion thereof closely contacts the mounting wall. In this state, there is no space between the lower portion of the display main body 101 and the mounting wall 170, through which a cable 195 pass to be connected to a cable port (not shown) provided in a back lower portion of the display main body 101. Therefore, in the state that the display is mounted to the mounting wall as shown in FIG. 7, there arises a problem in that it is difficult to connect the cable 195 to the cable port provided in the back lower portion of the display main body 101. That is, in the conventional display, when the cable 195 is accidentally unplugged from the cable port or there is needed to additionally connect another cable to the cable port, the display main body 101 should be apart from the mounting wall in order to newly connect the cable 195 or the another cable with the cable port of the display main body 101.

SUMMARY OF THE INVENTION

In order to solve the foregoing and/or other problems, it is an aspect of the present general inventive concept to provide a display in which a view angle of a display main body can be easily adjusted and a cable can be easily connected to a rear portion of the display main body without separating the display main body from a mounting wall.

Another aspect of the present general inventive concept is to provide a TV signal receiving module and a portable computer having the TV signal receiving module to be connected to and recognized by the portable computer while the portable computer operates.

Additional aspects and/or advantages of the general inventive concept will be set forth in part in the description which follows and, in part, will be obvious from the description, or may be learned by practice of the general inventive concept.

The foregoing and/or other aspects of the present general inventive concept may be achieved by providing a display with a display main body having a screen, the display including an upper link assembly which has an upper first link having a first end rotatably coupled with a mounting wall, an upper second link having a first end rotatably coupled with the display main body, and a second end rotatably coupled with a second end of the upper first link, and which connects an upper rear portion of the display main body to the mounting wall, and a lower link assembly which includes a lower first link having a first end rotatably coupled with the mounting wall, and a lower second link having a first end rotatably coupled with the display main body, and a second end rotatably coupled with a second end of the lower first link, and which connects a lower rear portion of the display main body to the mounting wall, the display main body being rotatable between a first tilted position that an upper portion thereof is apart from the mounting wall while a lower portion thereof is in contact with the mounting wall, and a second tilted position that the upper portion is in contact with the mounting wall while the lower portion is apart from the mounting wall.

According to an aspect of the general inventive concept, the display is provided with at least one cable port in a rear portion thereof, and at the second tilted position, a cable work space is secured between the rear portion of the display main body and the mounting wall, and a cable can be connected to the cable port through the cable work space.

According to another aspect of the general inventive concept, the display further includes a main bracket detachably provided in the rear portion of the display main body and connected with the upper and lower link assemblies, wherein the main bracket has an upper portion rotatably coupled with the first end of the upper second link, and a lower portion rotatably coupled with the first end of the lower second link.

According to yet another aspect of the general inventive concept, the display further includes a stationary bracket attached to the mounting wall to support the display main body through the upper and lower link assemblies, and the stationary bracket includes a first link bracket provided in an upper portion thereof and rotatably coupled with the first end of the upper first link, and a second link bracket provided in a lower portion thereof and rotatably coupled with the first end of the lower first link.

According to still another aspect of the general inventive concept, the main bracket is formed with a pair of brackets spaced-apart from each other by a predetermined distance, and the display further includes a screen supporting bar which has opposite ends respectively coupled with the pair of brackets to support a portion of the display main body.

According to another aspect of the general inventive concept, the rear portion of the display main body is provided with at least one engaging bolt to be engaged with the main bracket, and the main bracket is formed with an engaging hole corresponding to the engaging bolt of the display main body.

According to another aspect of the general inventive concept, the display further includes a safety supporter to safely maintain the cable work space secured when the display is in the second tilted position, and the safety supporter includes a safety pin insertion hole formed on the lower second link, and a safety pin inserted into the safety pin insertion hole when the display is in the second tilted position.

According to another aspect of the general inventive concept, the display further includes a safety pin accommodating hole formed in a rotatable coupling portion between the lower first link and the lower second link, wherein the safety pin is accommodated in the safety pin accommodating hole while the rear portion of the display main body is in contact with the mounting wall.

BRIEF DESCRIPTION OF THE DRAWINGS

These and/or other aspects and advantages of the general inventive concept will become apparent and more readily appreciated from the following description of the preferred embodiments, taken in conjunction with the accompanying drawings of which.

DETAILED DESCRIPTION OF THE PREFERRED EMBODIMENTS

Figure 1:
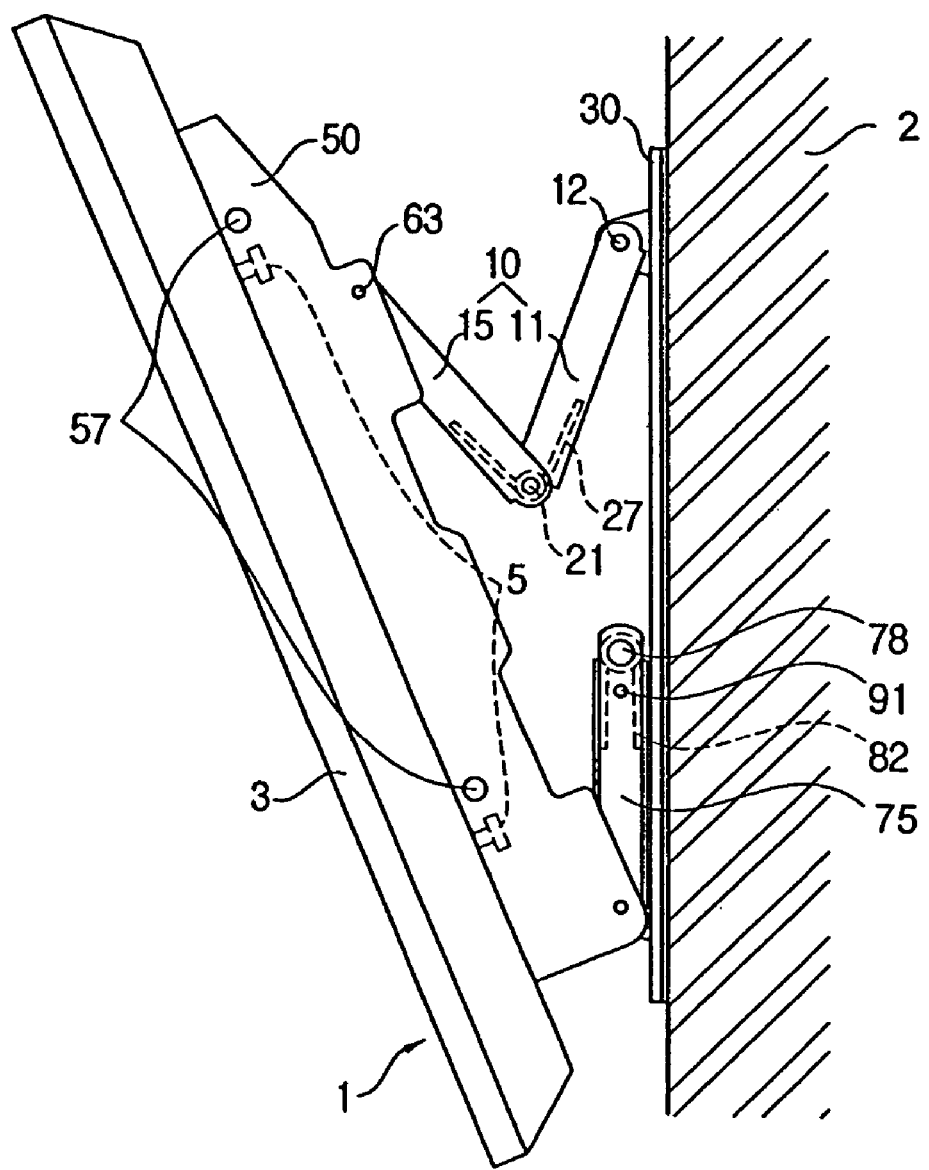
FIG. 1 is a lateral perspective view of a display in a first tilted position according to an embodiment of the present general inventive concept.

Reference will now be made in detail to the present preferred embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
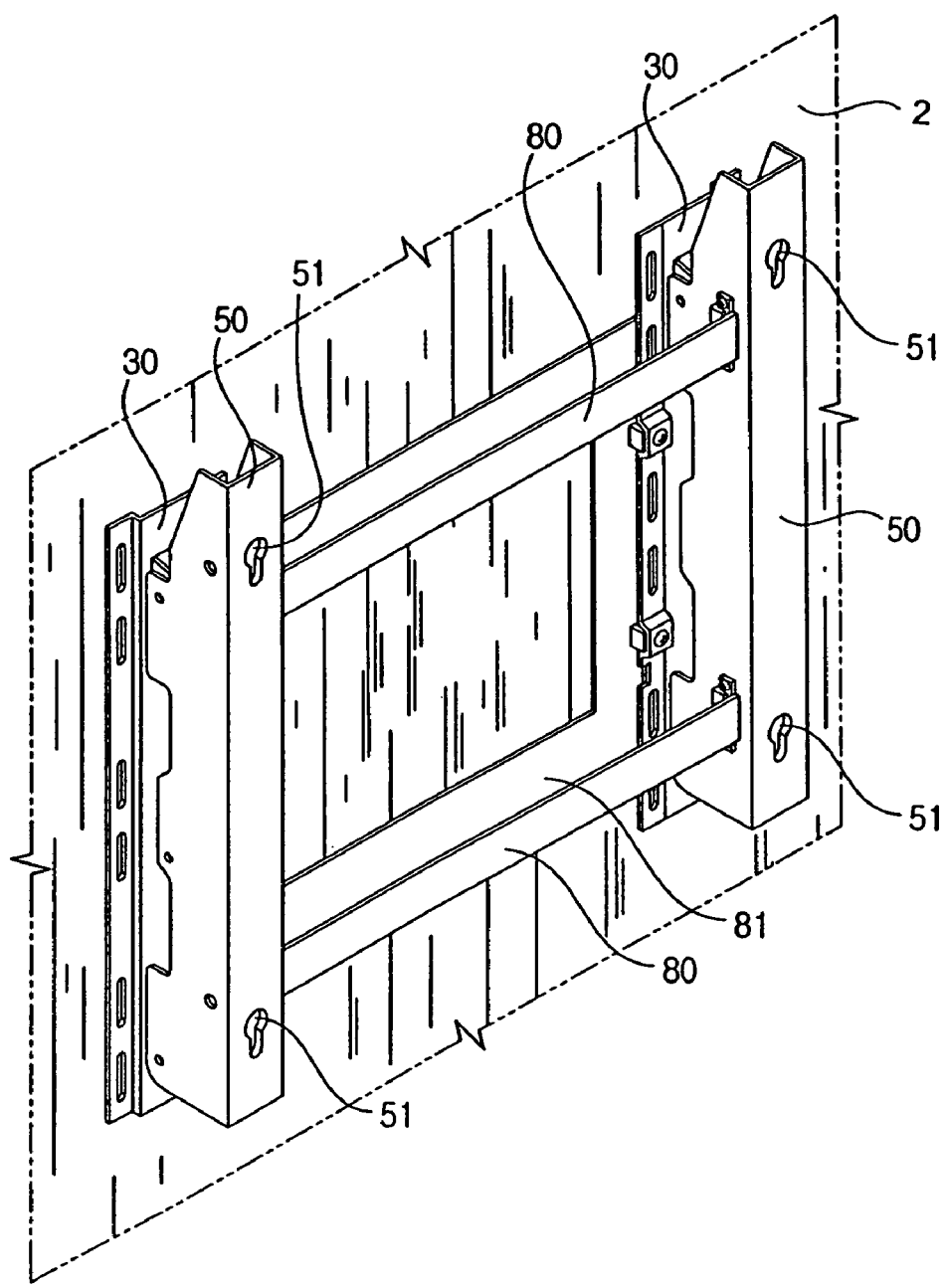
FIG. 2 is a perspective view of a display mounting apparatus in the display of FIG. 1.
Figure 3:
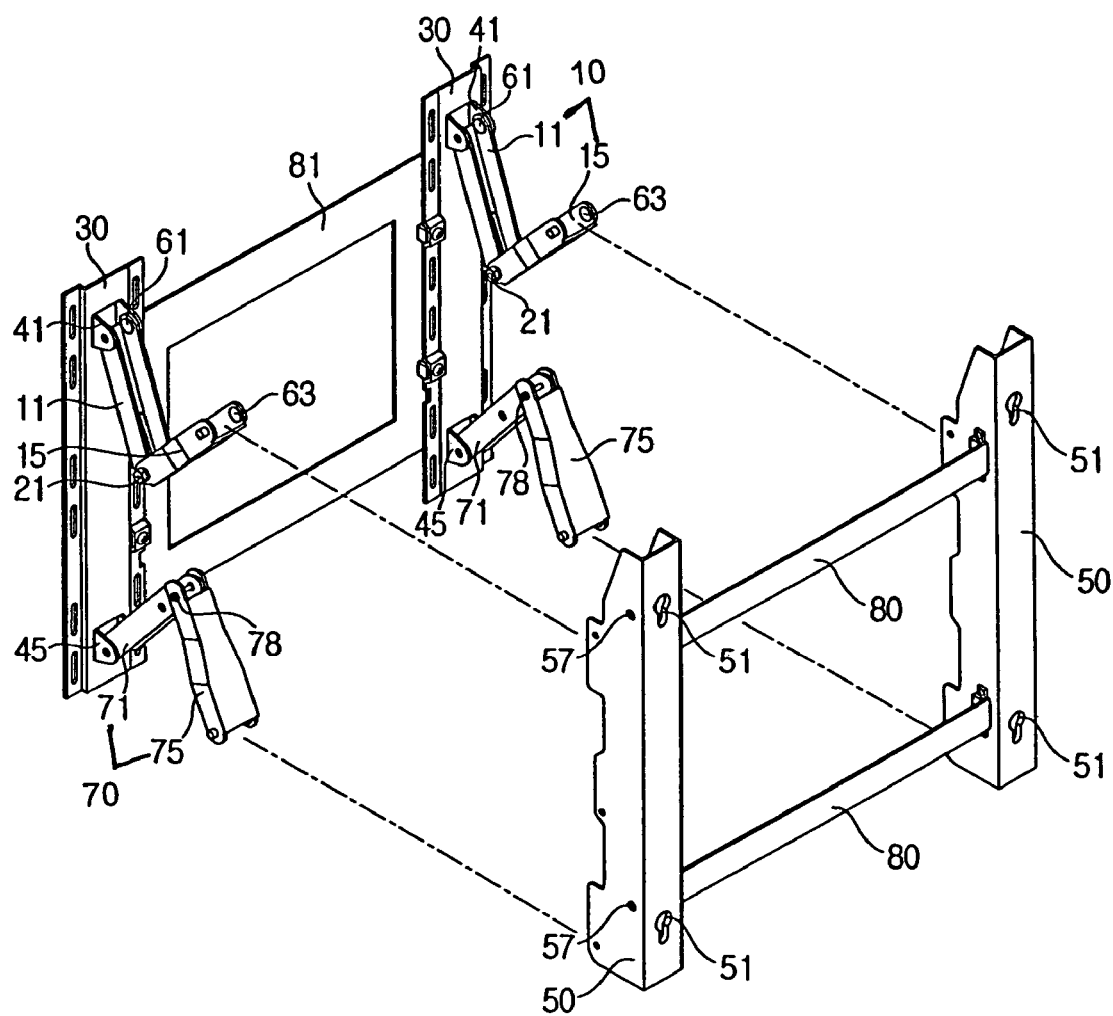
FIG. 3 is an exploded perspective view of the display mounting apparatus of FIG. 2.
Figure 4:
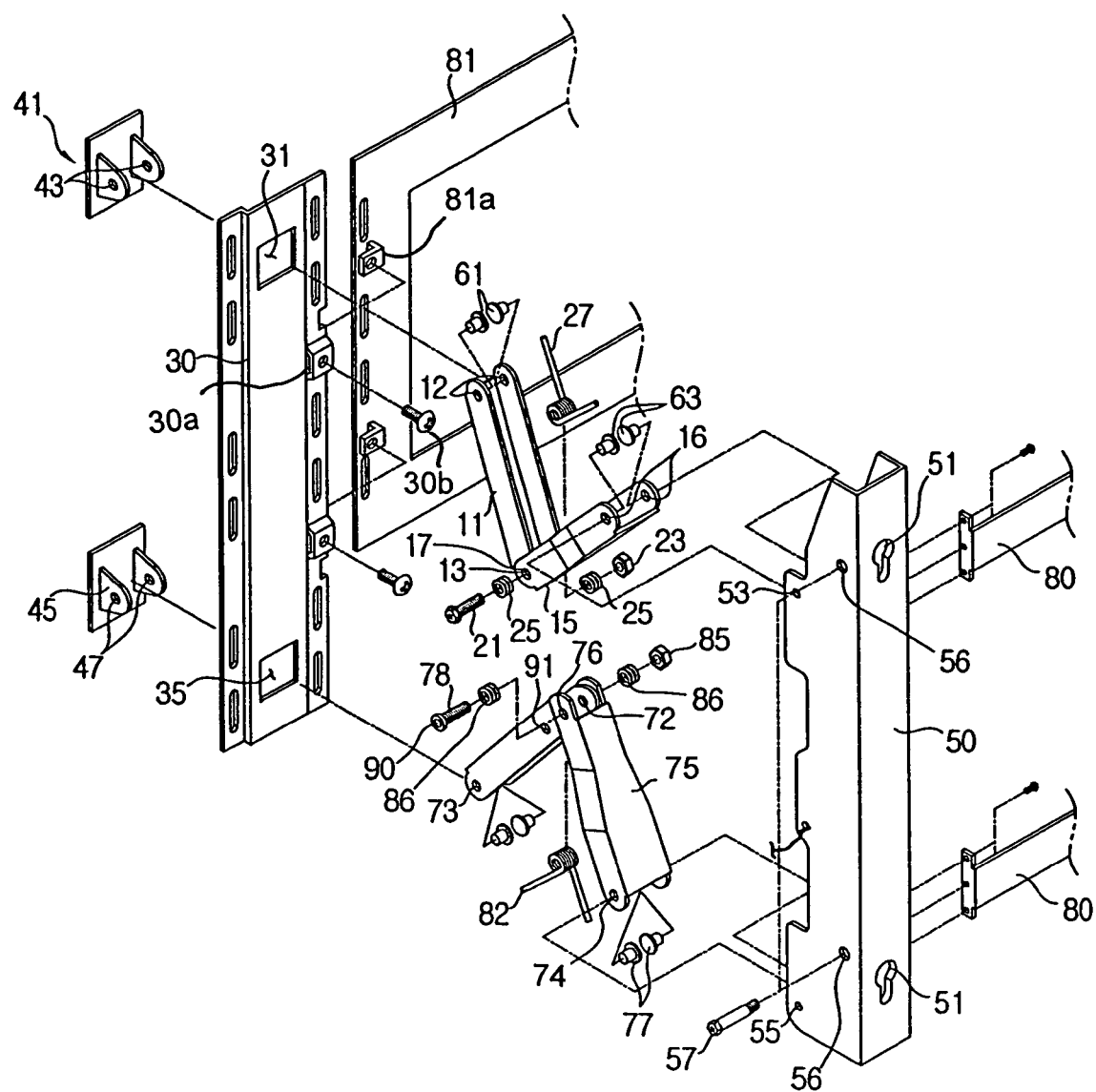
FIG. 4 is a partial exploded perspective view of the display mounting apparatus of FIG. 3.

FIG. 1 is a lateral perspective view of a display at in a first tilted position according to an embodiment of the present general inventive concept, and FIGS. 2 through 4 are a perspective view, an exploded perspective view, and a partial exploded perspective view of a display mounting apparatus in the display of FIG. 1, respectively. As shown in FIG. 1, the display may include a display main body 1 having a screen 3, and the display mounting apparatus to tiltably mount the display main body 1 onto a predetermined seating surface. The display mounting apparatus may include a main bracket 50 to support the display main body 1, a stationary bracket 30 attached to a mounting wall 2 and supporting the main bracket 50, and a link assembly (upper and lower link assemblies 10 and 70 of FIG. 3) provided between the main bracket 50 and the stationary bracket 30. The upper link assembly 10 can includes an upper first link 11 and an upper second link 15, and the lower link assembly 70 can include a lower first link 71 and a lower second link 75 as shown in FIGS. 1 and 3.

Although the display mounting apparatus has symmetrical structures formed in a pair as shown in FIG. 3, only a left side of the display mounting apparatus, as shown in FIG. 4, will be representatively described hereinbelow.

Referring to FIGS. 1 through 4, the screen 3 employing a display device, such as an LCD, a PDP, etc., can be is provided in front of the display main body 1, and can be supported by a screen supporting bar 80 (FIG. 3) and the main bracket 50. On a rear portion of the display main body 1 is provided a plurality of engaging bolts 5 to be coupled with engaging holes 51 (FIG. 2) of the main bracket 50.

Here, the engaging bolt 5 can have a head and a rod and can be fastened to the rear portion of the display main body 1, and the head can be spaced-apart from the rear portion of the display main body 1 by a predetermined distance and can have a cross section larger than that of the rod. Further, lateral sides of a screen supporting bracket 81 (FIG. 3)

formed with an opening in a center thereof are coupled to the pair of stationary brackets 30, respectively.

The main bracket 50 may have a "" ⊏ ""-shaped cross section having side plates and a middle coupled between the side plates, and an upper first portion of the side plates of the main bracket 50 can be formed with a pair of second pin coupling holes 53 (FIG. 4) rotatably coupled to a second pin connecting hole 16 (FIG. 4) of the upper second link 15. Here, the main bracket 50 can be larger than the second link 15, so that the second link 15 can be accommodated in an inside defined by the side plates and the middle plate of the main bracket 50. When the second link 15 and the main bracket 50 are assembled in a state that the second link 15 is accommodated in the inside of the main bracket 50, the second pin connecting hole 16 of the second link 15 can be aligned with the second pin coupling hole 53 of the main bracket 50.

Further, a lower first portion of the side plates of the main bracket 50 can be formed with a pair of fourth pin coupling holes 55 (FIG. 4), and the fourth pin coupling holes 55 are rotatably coupled to lower second pin connecting holes 74 of the lower second link 75. Also, the middle portion of the main bracket 50 can be formed with the engaging holes 51 along a lengthwise direction thereof in correspondence to the engaging bolts 5 provided on the rear portion of the display main body 1. Here, the engaging holes 51 can include an upper portion larger than the head of the engaging bolt 5, and a lower portion smaller than the head of the engaging bolt 5 and larger than the rod of the engaging bolt 5. Thus, the head of the engaging bolt 5 fastened to the rear portion of the display main body 1 can be inserted in the upper portion of the engaging hole 51, and then the engaging bolt 5 is moved toward and fitted into the lower portion of the engaging hole 51. Accordingly, the head of the engaging bolt 5 is prevented from being released from the main bracket 50 when the rod of the engaging bolt 5 is inserted into the lower portion of the engaging holes 51, thereby conveniently attaching the display main body 1 to the main bracket 50.

Further, the main bracket 50 can be formed with a safety bolt hole 56 (FIG. 4) at lateral sides thereof with respect to the engaging hole 51, so that a safety bolt 57 (FIG. 4) is inserted in the safety bolt hole 56 to prevent the display main body 1 attached to the main bracket 50 from separating from the main bracket 50 by an external force. Thus, after the engaging bolt 5 of the display main body 1 is engaged with the engaging hole 51 of the main bracket 50, the safety bolt 57 can be inserted into the safety bolt hole 56 formed in the main bracket 50, can be disposed between the head of the engaging bolt 5 and the middle plate of the main bracket 50, and can prevent the rod of the engaging bolt 5 from be lifted from the lower portion to the upper portion of the engaging hole 51, thereby preventing the engaging bolt 5 from separating from the engaging hole 51. Here, the engaging hole 51 can be provided in plural to hold various sizes of the display main body 1.

The pair of main brackets 50 can be connected by a pair of screen supporting bars 80 arranged transversely to the main bracket 50. Here, the pair of screen supporting bars 80 can be employed to support the screen 3 in a state that the display main body 1 moves frontward and is inclined relative to the mounting wall 2 as shown in FIG. 1, so that the display main body 1 is prevented from being forcibly strained by weight of the screen 3.

The stationary bracket 30 can be shaped like a thin plate and mounted to the mounting wall 2. An upper portion of the stationary bracket 30 can be formed with a first through hole 31 having a rectangular shape, through which a first link bracket 41 passes and is rotatably connected with a first pin connecting hole 12 of the upper first link 11 (to be described later). Further, a lower portion of the stationary bracket 30 can be formed with a second through hole 35 having a rectangular shape, through which a second link bracket 45 passes and is rotatably connected with a lower first pin connecting hole 73 of a lower first link 71 (to be described later).

The first link bracket 41 can include a first side having a plate shape to be attached to the upper portion of the stationary bracket 30 through the first through hole 31, and a second side protruding from the first side and having a pair of first pin coupling holes 43 so that the upper first link 11 is rotatably coupled to the second side of the first link bracket 11 by inserting upper first hinge pins 61 into the first pin coupling holes 43 and the first pin connecting holes 12. Further, the second link bracket 45 can comprises a first side having a plate shape to be attached to the lower portion of the stationary bracket 30 through the second through hole 35, and a second side protruding from the first side and having a pair of third pin coupling holes 47, so that the lower first link 71 is rotatably coupled to the second side of the second link bracket 45 by inserting the lower first hinge pins 79 into the lower first pin connecting holes 73 of the lower first link 71 and the third pin coupling holes 47.

The first link bracket 41, the second link bracket 45, and the stationary bracket 30 can be formed in a single monolithic body. A first coupler 81a can be formed on the screen supporting bracket 81 to be coupled to a second coupler 30a formed on the stationary bracket 30 by a screw 30b as shown FIG. 4, so that the pair of the stationary bracket can be spaced apart by a desired distance while being connected to the screen supporting bracket 81.

The upper link assembly 10 can be disposed behind an upper portion of the display main body 1 to connect the display main body 1 with the mounting wall 2, and the lower link assembly 70 can be disposed behind a lower portion of the display main body 1 to connect the display main body 1 with the mounting wall 2.

The upper link assembly 10 can include the upper first link 11, the upper second link 15, an upper helical torsion spring 27 interposed between the upper first link 11 and the upper second link 15 and having elasticity to retain the display main body 1 against being apart from the mounting wall 2, and an upper friction portion provided in a rotatable coupling portion between the upper first link 11 and the upper second link 15 and providing a resistance against a rotation of the upper first and second links 11 and 15. Here, the rotation resistance of the upper friction portion can be stronger than the elasticity of the upper helical torsion spring 27.

The upper first link 11 can have a "" ⊏ ""-shaped cross section and can include a first end formed with the pair of upper first pin connecting holes 12 which are rotatably coupled with the first pin coupling holes 43 of the first link bracket 41 by a pair of upper first hinge pins 61, respectively, and a second end formed with a pair of upper bolt coupling holes 13 to be rotatably coupled with the upper second link 15.

The upper second link 15 can include a first end formed with the pair of upper second pin connecting holes 16 to be rotatably coupled with the second pin coupling holes 53 of the main bracket 50 by a pair of upper second hinge pins 63, and a second end formed with a pair of upper bolt connecting holes 17 to be rotatably coupled with the upper bolt coupling holes 13 of the upper first link 11. Here, the upper second link 15 can have a ""⊏""-shaped cross section and can be larger than the upper first link 11, so that the upper second link 15 rotates toward the upper first link 11 and accommodates the upper first link 11.

The upper helical torsion spring 27 can be inserted around an upper coupling bolt 21 of the upper friction portion, can have a first end supported by the upper first link 11 and a second end supported by the upper second link 15, and can have the elasticity to retain the upper second link 15 not to become apart from the upper first link 11 or to maintain a distance with the upper first link 11. Thus, the upper helical torsion spring 27 can be employed to elastically bias the display main body 1 against or toward the mounting wall 2.

The upper friction portion can include the upper coupling bolt 21 to pass through the upper bolt coupling hole 13 of the upper first link 11 and the upper bolt connection hole 17 of the upper second link 15 and to be inserted in the upper helical torsion spring 27, an upper coupling nut 23 coupled with the upper coupling bolt 21, and a plurality of upper washers 25 interposed between the upper coupling bolt 21 and the upper coupling nut 23. As the upper coupling bolt 21 and the upper coupling nut 23 are coupled to each other, friction occurs in the upper friction portion and resists a relative rotation between the upper first and second links 11 and 15, and the friction should be somewhat stronger than the elasticity of the upper helical torsion spring 27. Thus, even though the display main body 1 is disposed apart from the main bracket 50, the main bracket 50 can maintain its tilted angle relative to the stationary bracket 30 because the friction of the upper friction portion is stronger than the elasticity of the upper helical torsion spring 27. Further, the plurality of upper washers 25 are interposed between the upper coupling bolt 21 and the upper coupling nut 23, thereby preventing the upper coupling bolt 21 and the upper coupling nut 23 from being released from each other.

The lower link assembly 70 can include the lower first link 71, the lower second link 75, a lower helical torsion spring 82 interposed between the lower first link 71 and the lower second link 75 and having elasticity to retain the display main body 1 not to be apart from the mounting wall 2, and a lower friction portion provided in a rotatable coupling portion between the lower first link 71 and the lower second link 75 and providing resistance against the rotation. Here, the rotation resistance of the lower friction portion can be stronger than the elasticity of the lower helical torsion spring 82.

The lower first link 71 can have a ""⊏""-shaped cross section and can include a first end formed with the lower first pin connecting holes 73 which are rotatably coupled with the third pin coupling hole 47 of the second link bracket 45 by the lower first hinge pins 79, and a second end formed with a pair of lower bolt coupling holes 72 to be rotatably coupled with the lower second link 71.

The lower second link 75 can include a first end formed with the lower second pin connecting holes 74 to be rotatably coupled with the fourth pin coupling holes 55 of the main bracket 50 by a pair of lower second hinge pins 77, and a second end formed with a pair of lower bolt connecting holes 76 to be rotatably coupled with the lower bolt coupling holes 72 of the lower first link 71. Here, the lower second link 74 can have a ""⊏""-shaped cross section and can be larger than the lower first link 71 in width in a horizontal direction, so that the lower second link 74 rotates toward the lower first link 71 and accommodates the lower first link 71.

The lower helical torsion spring 82 can be disposed to be inserted around a lower coupling bolt 78 of the lower friction portion, and can have a first end supported by the lower first link 71 and a second end supported by the lower second link 75, with the elasticity to retain the lower second link 75 not to be apart from the lower first link 71. Thus, the lower helical torsion spring 82 can be employed to elastically bias the display main body 1 not to be apart the mounting wall 2.

The lower friction portion can include the lower coupling bolt 78 to pass through the lower bolt coupling hole 72 of the lower first link 71 and the lower bolt connection hole 76 of the lower second link 74 and to be inserted in the lower helical torsion spring 82, an lower coupling nut 85 coupled with the lower coupling bolt 78, and a plurality of lower washers 86 interposed between the lower coupling bolt 78 and the lower coupling nut 85. As the lower coupling bolt 78 and the lower coupling nut 85 are coupled to each other, friction can occur in the lower friction portion and can resist a relative rotation between the lower first and second links 71 and 75, and the friction can be somewhat stronger than the elasticity of the lower helical torsion spring 82. Thus, even though the display main body 1 is apart from the main bracket 50, the main bracket 50 can maintain its tilted angle relative to the stationary bracket 30 because the friction of the lower friction portion is stronger than the elasticity of the lower helical torsion spring 82. Further, the plurality of lower washers 86 can be interposed between the lower coupling bolt 78 and the lower coupling nut 85, thereby preventing the lower coupling bolt 78 and the lower coupling nut 85 from being released from each other.

With this configuration, in the display according to the present invention, a tilting operation of the display main body 1 to adjust a view angle thereof will be described.

Figure 5:
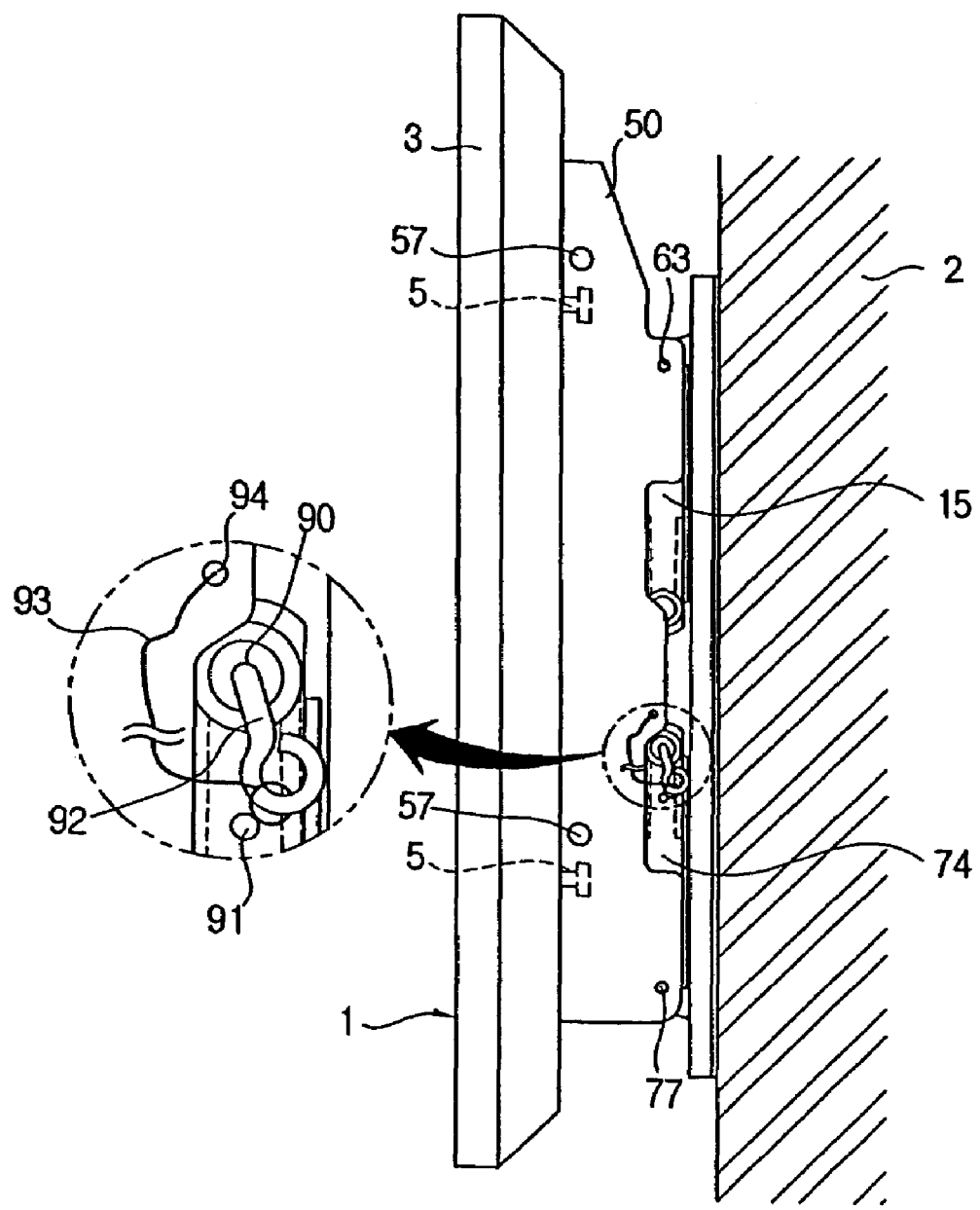
FIG. 5 is a lateral perspective view of the display of FIG. 1 in a folded position, and a safety supporter according to another embodiment of the present general inventive concept.

As shown in FIG. 5, the tilting operation will be described with respect to a folded position where the rear portion of the display main body 1 is in close contact with the mounting wall 2. In this state, the upper first link 11 and the upper second link 15 are in contact with each other in the folded position, and the lower first link 71 and the lower second link 75 are in contact with each other in the folded position.

When a user holds an upper portion of the display main body 1 and pulls the display main body 1 frontward in order to adjust the view angle, the upper first link 11 and the upper second link 15 become apart from each other as shown in FIG. 1, so that the upper portion of the display main body 1 is apart from the mounting wall 2 while a lower portion of the display main body 1 is in contact with the mounting wall 2 because the lower first link 71 and the lower second link 75 are maintained being in contact with each other. Thus, the display main body 1 is tilted relative to the mounting wall 2 at a first tilted position, with the upper portion thereof inclined forward.

On the other hand, while the upper first link 11 and the upper second link 15 are in contact with each other, and the lower first link 71 and the lower second link 75 are in contact with each other, that is, while the rear portion of the display main body 1 is in contact with the mounting wall 2 (at the folded position of FIG. 5), a user may pull the lower portion of the display main body 1 when a power cable or a signal cable is accidentally unplugged from a cable port (not shown) provided in the rear portion of the display main body 1 contacting the mounting wall 2. Therefore, there is needed to connect the power cable or the signal cable to the cable port again or when there is needed to additionally connect a connection cable to the cable port provided in the display main body 1 in order to connect the display with a playback device, such as a digital video disc (DVD) player, a video tape recorder (VTR), etc.

Figure 6:
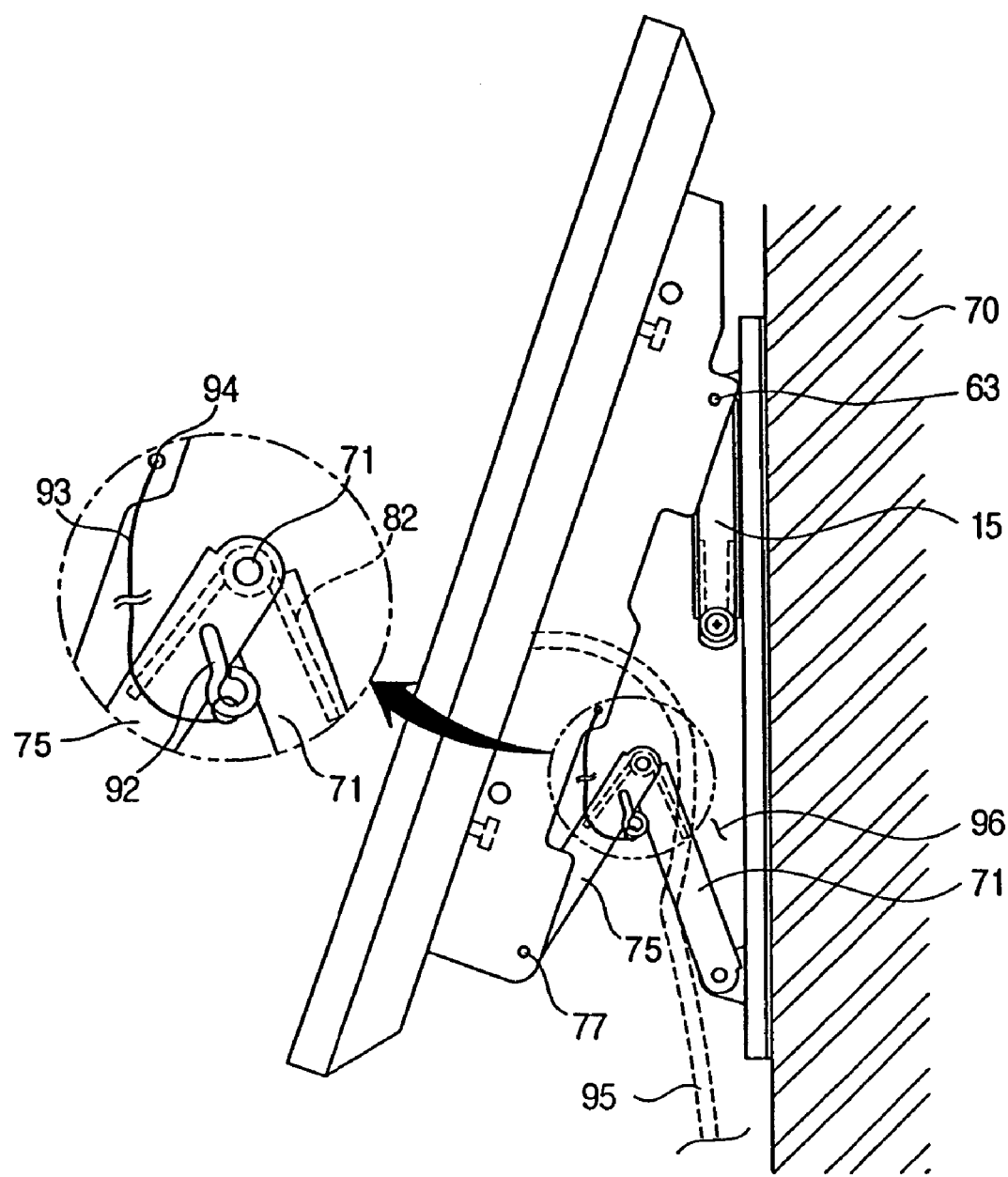
FIG. 6 is a lateral perspective view of the display of FIG. 1 in a second tilted position.
Figure 7:
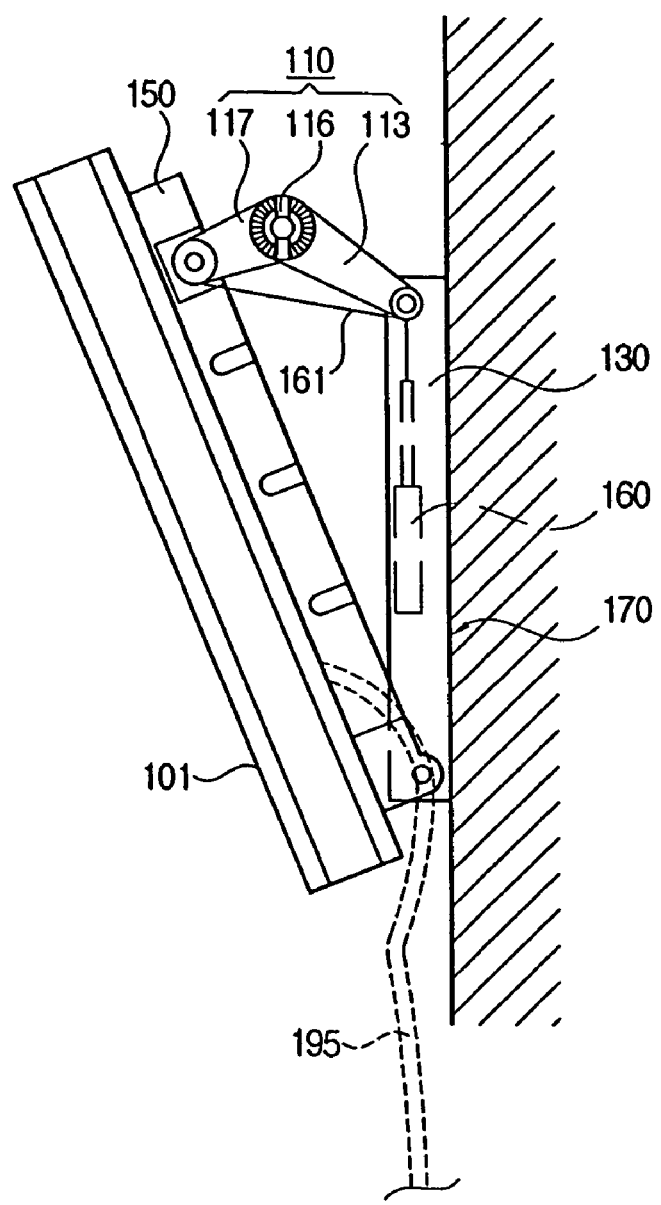
FIG. 7 is a lateral perspective view of a conventional display.

As shown in FIG. 6, the lower first link 71 and the lower second link 75 can be apart from each other, so that the lower portion of the display main body 1 is apart from the mounting wall 2, but the upper portion of the display main body 1 is in contact with the mounting wall 2 because the upper first link 11 and the upper second link 15 are maintained being in contact with each other. Thus, the display main body 1 is tilted relative to the mounting wall 2 at a second tilted position, with the lower portion thereof inclined forward.

At the second tilted position (refer to FIG. 6), a cable work space 96 is secured between the lower portion of the display main body 1 and the mounting wall 2, so that a user can easily connect a cable 95 to the cable port provided in a rear lower portion or the display main body 1 through the cable work space 96.

Additionally, FIGS. 5 and 6 show views of the display having a safety supporter to safely secure the cable work space 96 at the forgoing second tilted position, thereby allowing a user to safely connect the cable 95 to the cable port of the display main body 1, according to another embodiment of the present general inventive concept.

The safety supporter can include a safety pin accommodating hole 90 formed in the coupling bolt 78 coupling the lower fist link 71 and the lower second link 75, a safety pin insertion hole 91 formed on the lower second link 75, and a safety pin 92 accommodated in the safety pin accommodating hole 90 at the folded position (refer to FIG. 1) of the display main body 1 and inserted in the safety pin insertion hole 91 at the second tilted position (refer to FIG. 6). Here, the safety pin 92 can be connected to the main bracket 50 by a safety pin wire 93, and the safety pin wire 93 can have a first end connected to the safety pin 92 and a second end connected to a wire holding hole 94 formed in the main bracket 50.

In an aspect of the foregoing embodiment, the stationary bracket 30 can be separately provided between the mounting wall 2 and the link assemblies 10 and 70. However, the link assemblies 10 and 70 may be rotatably and directly mounted to the mounting wall 2. Further, in another aspect of the foregoing embodiment, the main bracket 50 can be separately provided between the display main body 1 and the link assemblies 10 and 70. However, the link assemblies 10 and 70 can be rotatably and directly coupled to the display main body 1.

In yet another aspect of the foregoing embodiment, the friction portion can be provided between the upper first link 11 and the upper second link 15 and between the lower first link 71 and the lower second link 75. However, the friction portion may be provided in a first rotatable portion between the stationary bracket 30 and the upper first link 11 and a second rotatable portion between the stationary bracket 30 and the lower first link 71. Further, the friction portion may be provided in a third rotatable portion between the main bracket 50 and the upper second link 15 and a fourth rotatable portion between the main bracket 50 and the lower second link 75.

In still another aspect of the foregoing embodiment, the upper helical torsion spring 27 can be used to provide the elasticity. However, a spring, such as a flat spring, a coil spring, etc., may be used to provide the elasticity to at least one of the rotatable portions between the upper first and second links 11 and 15 and the lower first and second links 71 and 75 provided between the display main body 1 and the mounting wall 2.

In another aspect of the foregoing embodiment, the display mounting apparatus can be symmetrically provided in a pair in one display main body 1. However, one display mounting apparatus or three or more display mounting apparatus may be provided according to the size of the display main body 1.

In another aspect of the foregoing embodiment, the safety bolt 57 and the safety bolt coupling hole 56 can be provided to prevent the display main body 1 from separating from the main bracket 50. However, instead of the safety bolt 57, a safety pin (not shown) without threaded lines may be used and the safety pin accommodating hole (not shown) may be used to accommodate the safety pin.

In another aspect of the foregoing embodiment, the display main body 1 moves with respect to the stationary bracket 30 to one of the folded position in which the display main body 1 is disposed substantially parallel to the stationary bracket 30 as shown in FIG. 5, the first tilted position in which the display main body 1 forms a positive angle with the stationary bracket 30 as shown in FIG. 1, and the second tilted position in which the display main body 1 forms a negative angle with the stationary bracket 30 as shown in FIG. 6.

As described above, in the display according to the embodiment of the present general inventive concept, the upper first and second links and the lower first and second links can be provided between the display main body and the mounting wall, so that the display has a simple structure and the view angle thereof can be easily adjusted by a little force. Moreover, the display main body can be tilted at the second inclined position (refer to FIG. 6), so that the cable work space is secured to pass the cable to be connected to the cable port provided in the rear portion of the display main body, thereby allowing a user to easily connect the cable to the cable port without separating the display main body from the mounting wall.

Furthermore, the present general inventive concept can provide a display in which a view angle of a display main body can be easily adjusted, and a cable can be easily connected to a rear portion of the display main body without separating the display main body from a mounting wall.

Although a few embodiments of the present general inventive concept have been shown and described, it would be appreciated by those skilled in the art that changes may be made in this embodiment without departing from the principles and spirit of the invention, the scope of which is defined in the claims and their equivalents.

What is claimed is:

1. A display with a display main body having a screen, the display comprising:

an upper link assembly which comprises an upper first link having a first end vertically rotatably coupled with a mounting wall, and an upper second link having a first end vertically rotatably coupled with the display main body and a second end rotatably coupled with a second end of the upper first link and connects an upper rear portion of the display main body to the mounting wall; and a lower link assembly which comprises a lower first link having a first end vertically rotatably coupled with the mounting wall, and a lower second link having a first end vertically rotatably coupled with the display main body and a second end rotatably coupled with a second end of the lower first link and connects a lower rear portion of the display main body to the mounting wall, wherein the display main body is rotatable between a first tilted position in which an upper portion thereof is spaced-apart from the mounting wall while a lower portion thereof is in contact with the mounting wall, and a second tilted position in which the upper portion is in contact with the mounting wall while the lower portion is spaced-apart from the mounting wall.

2. The display according to claim 1, wherein the display comprises at least one cable port in a rear portion thereof, and a rear portion of the display main body forms a cable work space with the mounting wall when the display main body is in the second tilted position, so that a cable is connected to the cable port through the cable work space.

3. The display according to claim 2, further comprising:
a main bracket detachably provided in the rear portion of the display main body and connected with the upper and lower link assemblies,
wherein the main bracket comprises an upper portion rotatably coupled with the first end of the upper second link, and a lower portion rotatably coupled with the first end of the lower second link.

4. The display according to claim 3, further comprising:
a stationary bracket attached to the mounting wall to support the display main body and the upper and lower link assemblies,
wherein the stationary bracket comprises a first link bracket provided in an upper portion thereof and rotatably coupled with the first end of the upper first link, and a second link bracket provided in a lower portion thereof and rotatably coupled with the first end of the lower first link.

5. The display according to claim 4, wherein the main bracket comprises a pair of brackets spaced-apart from each other by a predetermined distance, and the display further comprises a screen supporting bar having opposite ends respectively coupled with the pair of brackets to support a portion of the screen.

6. The display according to claim 5, wherein the display main body comprises at least one engaging bolt formed on the rear portion thereof to be engaged with the main bracket, and
the main bracket comprises an engaging hole to correspond to the engaging bolt of the display main body.

7. The display according to claim 6, further comprising:
a safety supporter to maintain the cable work space secured in the second tilted position,
wherein the safety supporter comprises a safety pin insertion hole formed on the lower second link, and a safety pin inserted in the safety pin insertion hole in the second tilted position.

8. The display according to claim 7, further comprising:
a safety pin accommodating hole formed in a rotatable coupling portion between the lower first link and the lower second link,
wherein the safety pin is accommodated in the safety pin accommodating hole while the rear portion of the display main body is in contact with the mounting wall.

9. The display according to claim 2, further comprising:
a safety supporter to maintain the cable work space secured in the second tilted position,
wherein the safety supporter comprises a safety pin insertion hole formed on the lower second link, and a safety pin inserted in the safety pin insertion hole in the second tilted position.

10. The display according to claim 9, further comprising:
a safety pin accommodating hole formed in a rotatable coupling portion between the lower first link and the lower second link,
wherein the safety pin is accommodated in the safety pin accommodating hole while the rear portion of the display main body is in contact with the mounting wall.

11. The display according to claim 1, further comprising:
a main bracket detachably provided in a rear portion of the display main body and connected with the upper and lower link assemblies,
wherein the main bracket comprises an upper portion rotatably coupled with the first end of the upper second link, and a lower portion rotatably coupled with the first end of the lower second link.

12. The display according to claim 11, further comprising:
a stationary bracket attached to the mounting wall to support the display main body and the upper and lower link assemblies,
wherein the stationary bracket comprises a first link bracket provided in an upper portion thereof and rotatably coupled with the first end of the upper first link, and a second link bracket provided in a lower portion and rotatably coupled with the first end of the lower first link.

13. The display according to claim 12, wherein the main bracket comprises a pair of brackets spaced-apart from each other by a predetermined distance, and
the display further comprises a screen supporting bar having opposite ends respectively coupled with the pair of stationary brackets to support a portion of the screen.

14. The display according to claim 13, wherein the display main body comprises at least one engaging bolt formed on the rear portion thereof to be engaged with the main bracket, and
the main bracket comprises an engaging hole to correspond to the engaging bolt of the display main body.

15. The display according to claim 14, further comprising:
a safety supporter to maintain the cable work space secured in the second tilted position,
wherein the safety supporter comprises a safety pin insertion hole formed on the lower second link, and a safety pin inserted in the safety pin insertion hole in the second tilted position.

16. The display according to claim 15, further comprising:
a safety pin accommodating hole formed in a rotatable coupling portion between the lower first link and the lower second link,
wherein the safety pin is accommodated in the safety pin accommodating hole while the rear portion of the display main body is in contact with the mounting wall.

17. A display mountable to a mounting wall, comprising:
a display main body having a plurality of engaging bolts;
a main bracket having a plurality of engaging holes to receive corresponding ones of the engaging bolts;
a stationary bracket mountable to a mounting wall; and
a link assembly having an upper and a lower link assemblies connected between the main bracket and the stationary bracket,
wherein the upper and a lower link assemblies are vertically rotatably connected to the main bracket and the stationary bracket to move the display main body with respect to the stationary bracket to one of a folded position in which the display main body is disposed substantially parallel to the stationary bracket, a first tilted position in which the display main body forms a positive angle with the stationary bracket, and a second tilted position in which a display main body forms a negative angle with the stationary bracket.

18. The display according to claim 17, wherein the engaging bolts of the display main body protrude from a rear portion thereof to face the main bracket, and the display main body is detachably attached to the main bracket when the engaging bolts are coupled to the main bracket through corresponding ones of the engaging holes.

19. The display according to claim 17, wherein the main bracket comprises a middle plate and at least one side plate extended from the middle plate by a distance in a direction from the main bracket to the stationary bracket, and the link assembly does not protrude from the main bracket in the direction when the display main body is in the folded position.

20. The display according to claim 17, wherein each of the upper and lower link assemblies comprises a first link rotatably coupled to the stationary bracket, a second link rotatably coupled between the first link and the main bracket, an elastic member to bias the first link against the second link, and a friction portion formed between the first and second links to generate a friction force greater than elasticity of the elastic member.

21. The display according to claim 17, wherein the upper link assembly comprises an upper first link having a first end vertically rotatably coupled to the stationary bracket, and an upper second link having a first end vertically rotatably coupled with the display main body and a second end rotatably coupled with a second end of the upper first link; and the lower link assembly which comprises a lower first link having a first end vertically rotatably coupled to the stationary bracket, and a lower second link having a first end vertically rotatably coupled with the display main body and a second end rotatably coupled with a second end of the lower first link.

22. The display according to claim 21, wherein the first ends of the upper first and second links of the upper link assembly moves in a first direction from a first peripheral portion of the display main body to a center portion of the display main body when the first ends of the lower first and second links of the lower link assembly moves in a second direction from a second peripheral portion of the display main body to the center portion of the display main body.

23. The display according to claim 22, wherein the first ends of the upper first and second links of the upper link assembly moves in a third direction opposite to the first when the first ends of the lower first and second links of the lower link assembly moves in a fourth direction opposite to the second direction.

24. The display according to claim 21, wherein the upper first and second links and the lower first and second links are folded in the folded position.

25. The display according to claim 24, wherein the folded upper first and second links and the folded lower first and second links do not protrude from the main bracket toward an outside of the main bracket.

26. The display according to claim 21, wherein the upper first and second links form an angle while the lower first and second links are folded in the first tilted position, so that the display main body forms the positive angle with the stationary bracket.

27. The display according to claim 21, wherein the lower first and second links form an angle while the upper first and second links are folded in the second tilted position, so that the display main body forms the negative angle with the stationary bracket.

28. The display according to claim 21, wherein the upper link assembly comprises an elastic member connected between the upper first and second links to bias one of the upper first and second links toward the other one of the upper first and second links, and the lower first and second links are connected to each other with a friction force which is greater than an elastic force of the elastic member.

29. The display according to claim 21, wherein the display main body comprises a first portion disposed close to the stationary bracket and a second portion disposed away from the stationary bracket when the display main body is in the first tilted position, and the first portion of the display main body is disposed away from the stationary bracket while the second portion of the display main body is disposed close to the stationary bracket when the display main body is in the second tilted position.

30. The display according to claim 29, wherein the first portion and the second portion of the display main body are disposed opposite to each other with respect to a center of the display main body.

31. The display according to claim 17, wherein the positive angle is opposite to the negative angle with respect to the folded position.

32. The display according to claim 17, wherein the upper link assembly moves with respect to the stationary bracket while the lower link assembly does not move with respect to the stationary bracket, so that the display main body is in the first tilted position to form the position angle with the stationary bracket.

33. The display according to claim 17, wherein one of the upper link assembly and the lower link assembly moves with respect to the stationary bracket while the other one of the upper link assembly and the lower link assembly does not move with respect to the stationary bracket, so that the display main body moves to one of the first tilted position and the second tilted position to form one of the position angle and the negative angle with the stationary bracket.

34. The display according to claim 17, wherein one of the upper link assembly and the lower link assembly moves with respect to the stationary bracket while the other one of the upper link assembly and the lower link assembly does not move with respect to the stationary bracket, so that the display main body moves from the folded position to one of the first tilted position and the second tilted position.

35. A display mount, comprising:
a stationary bracket mountable on a first surface;
a main bracket to accommodate the display;
at least two upper link assemblies to connect upper portions of the stationary bracket to the main bracket, to move an upper portion of the main bracket away from the stationary bracket; and
at least two lower link assemblies to connect lower portions of the stationary bracket to the main bracket, to move lower portions of the main bracket away from the stationary bracket;
wherein the movement of the upper link assemblies is independent from the movement of the lower link assemblies, and each of the upper and lower link assemblies comprises:
a first section vertically rotatably coupled to the stationary bracket,
a second section vertically rotatably couple to the main bracket, and
a coupler to connect the first and second sections.

* * * * *